US008299667B2

(12) United States Patent
Isoda et al.

(10) Patent No.: US 8,299,667 B2
(45) Date of Patent: Oct. 30, 2012

(54) AUTOMOTIVE CONTROLLING APPARATUS-INTEGRATED DYNAMOELECTRIC MACHINE

(75) Inventors: Hitoshi Isoda, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 12/985,890

(22) Filed: Jan. 6, 2011

(65) Prior Publication Data

US 2011/0273042 A1    Nov. 10, 2011

(30) Foreign Application Priority Data

May 10, 2010    (JP) ................. 2010-107912

(51) Int. Cl.
*H02K 11/00* (2006.01)
*H02K 19/22* (2006.01)

(52) U.S. Cl. ........ 310/68 D; 310/71; 310/68 B; 310/263

(58) Field of Classification Search ............ 310/71, 310/68 D, 68 B; 363/144, 141
See application file for complete search history.

(56) References Cited

U.S. PATENT DOCUMENTS

| | | | | |
|---|---|---|---|---|
| 6,936,941 B2* | 8/2005 | Oohashi et al. | ............ | 310/68 D |
| 7,339,294 B2* | 3/2008 | Oohashi et al. | ............ | 310/68 B |
| 7,400,070 B2* | 7/2008 | Asao et al. | ............ | 310/58 |
| 7,400,076 B2* | 7/2008 | Utsumi et al. | ............ | 310/263 |
| 7,411,324 B2* | 8/2008 | Kusumi | ............ | 310/68 D |
| 7,414,339 B2* | 8/2008 | Kitamura et al. | ............ | 310/68 D |
| 7,479,718 B2* | 1/2009 | Kikuchi et al. | ............ | 310/68 R |
| 7,498,701 B2* | 3/2009 | Kikuchi et al. | ............ | 310/68 B |
| 7,541,703 B2* | 6/2009 | Uehara et al. | ............ | 310/68 D |
| 7,545,061 B2* | 6/2009 | Asao et al. | ............ | 310/58 |
| 7,589,481 B2* | 9/2009 | Sonoda et al. | ............ | 318/34 |
| 7,610,973 B2* | 11/2009 | Asao et al. | ............ | 180/65.21 |
| 7,638,910 B2* | 12/2009 | Akita et al. | ............ | 310/68 D |
| 7,646,120 B2* | 1/2010 | Nishimura et al. | ............ | 310/68 R |
| 7,960,880 B2* | 6/2011 | Hino et al. | ............ | 310/68 D |
| 8,110,954 B2* | 2/2012 | Maeda et al. | ............ | 310/68 D |
| 2009/0179510 A1* | 7/2009 | Yoshida et al. | ............ | 310/62 |
| 2010/0308700 A1* | 12/2010 | Isoda et al. | ............ | 310/68 D |
| 2011/0101804 A1* | 5/2011 | Isoda et al. | ............ | 310/64 |
| 2011/0273042 A1* | 11/2011 | Isoda et al. | ............ | 310/63 |

FOREIGN PATENT DOCUMENTS

JP    11356006    12/1999
(Continued)

OTHER PUBLICATIONS

Japanese Office Action issued in Application No. 2010-107912 dated May 8, 2012.

*Primary Examiner* — Karl Tamai
(74) *Attorney, Agent, or Firm* — Sughrue Mion, PLLC

(57) ABSTRACT

A controlling apparatus-integrated dynamoelectric machine Includes: a metal housing that includes a front bracket and a rear bracket; a rotor that is rotatably disposed inside the housing by being fixed to a shaft that is rotatably supported by the front bracket and the rear bracket; a stator that includes: a cylindrical stator core that is disposed so as to be held between the front bracket and the rear bracket so as to surround the rotor; and a stator winding that is mounted to the stator core; and a controlling apparatus that includes: a direct-current alternating-current power interconverting circuit portion that passes electric current to the stator winding; and a controlling circuit portion that controls the direct-current alternating-current power interconverting circuit portion, the controlling apparatus being disposed inside the rear bracket.

5 Claims, 9 Drawing Sheets

FOREIGN PATENT DOCUMENTS

| | | |
|---|---|---|
| JP | 2003324903 | 11/2003 |
| JP | 2007-336638 A | 12/2007 |
| JP | 2008178227 | 7/2008 |
| JP | 2010022113 | 1/2010 |

* cited by examiner

AUTOMOTIVE CONTROLLING APPARATUS-INTEGRATED DYNAMOELECTRIC MACHINE

BACKGROUND OF THE INVENTION

1. Field of the Invention

The present invention relates to an automotive controlling apparatus-integrated dynamoelectric machine that includes a controlling apparatus that is constituted by a direct-current alternating-current power interconverting circuit and a controlling circuit that controls the direct-current alternating-current power interconverting circuit, and that has a generating function and an electric motor function.

2. Description of the Related Art

Conventional controlling apparatus-integrated dynamoelectric machines include: a dynamoelectric machine that has a generating function and an electric motor function; and a controlling apparatus that includes a power circuit portion, a controlling circuit board, and a field current controlling circuit portion, the power circuit portion and the field current controlling circuit portion being housed inside a housing space that is configured by a rear bracket of the dynamoelectric machine and a resin cover that is mounted axially outside the rear bracket, and the controlling circuit board is housed inside a housing space that is configured by the resin cover and a metal cover (see Patent Literature 1, for example).
Patent Literature 1: Japanese Patent Laid-Open No. 2007-336638 (Gazette)

In conventional controlling apparatus-integrated dynamoelectric machines, because the controlling apparatus is disposed axially outside the rear bracket of the dynamoelectric machine, one problem has been that the controlling apparatus is easily damaged by external mechanical shocks, or by collisions with airborne objects, etc.

SUMMARY OF THE INVENTION

The present invention aims to solve the above problems and an object of the present invention is to provide a controlling apparatus-integrated dynamoelectric machine in which a controlling apparatus is disposed inside a metal bracket of a dynamoelectric machine to enable occurrences of damage to the controlling apparatus that results from external mechanical shocks, or from collisions with airborne objects, etc., to be suppressed.

In order to achieve the above object, according to one aspect of the present invention, there is provided an automotive controlling apparatus-integrated dynamoelectric machine including: a metal housing that includes a front bracket and a rear bracket; a rotor that is rotatably disposed inside the housing by being fixed to a shaft that is rotatably supported by the front bracket and the rear bracket; a stator that includes: a cylindrical stator core that is disposed so as to be held between the front bracket and the rear bracket so as to surround the rotor; and a stator winding that is mounted to the stator core; and a controlling apparatus that includes: a direct-current alternating-current power interconverting circuit portion that passes electric current to the stator winding; and a controlling circuit portion that controls the direct-current alternating-current power interconverting circuit portion, wherein the controlling apparatus is disposed inside the rear bracket.

According to the present invention, because the controlling apparatus is disposed inside the metal rear bracket, external mechanical shocks do not act directly on the controlling apparatus, and airborne objects will not collide into the controlling apparatus. Thus, damage to the controlling apparatus that results from external mechanical shocks and collisions with airborne objects, etc., can be suppressed.

DETAILED DESCRIPTION OF THE PREFERRED EMBODIMENTS

Preferred embodiments of the present invention will now be explained with reference to the drawings.

Embodiment 1

Figure 1:
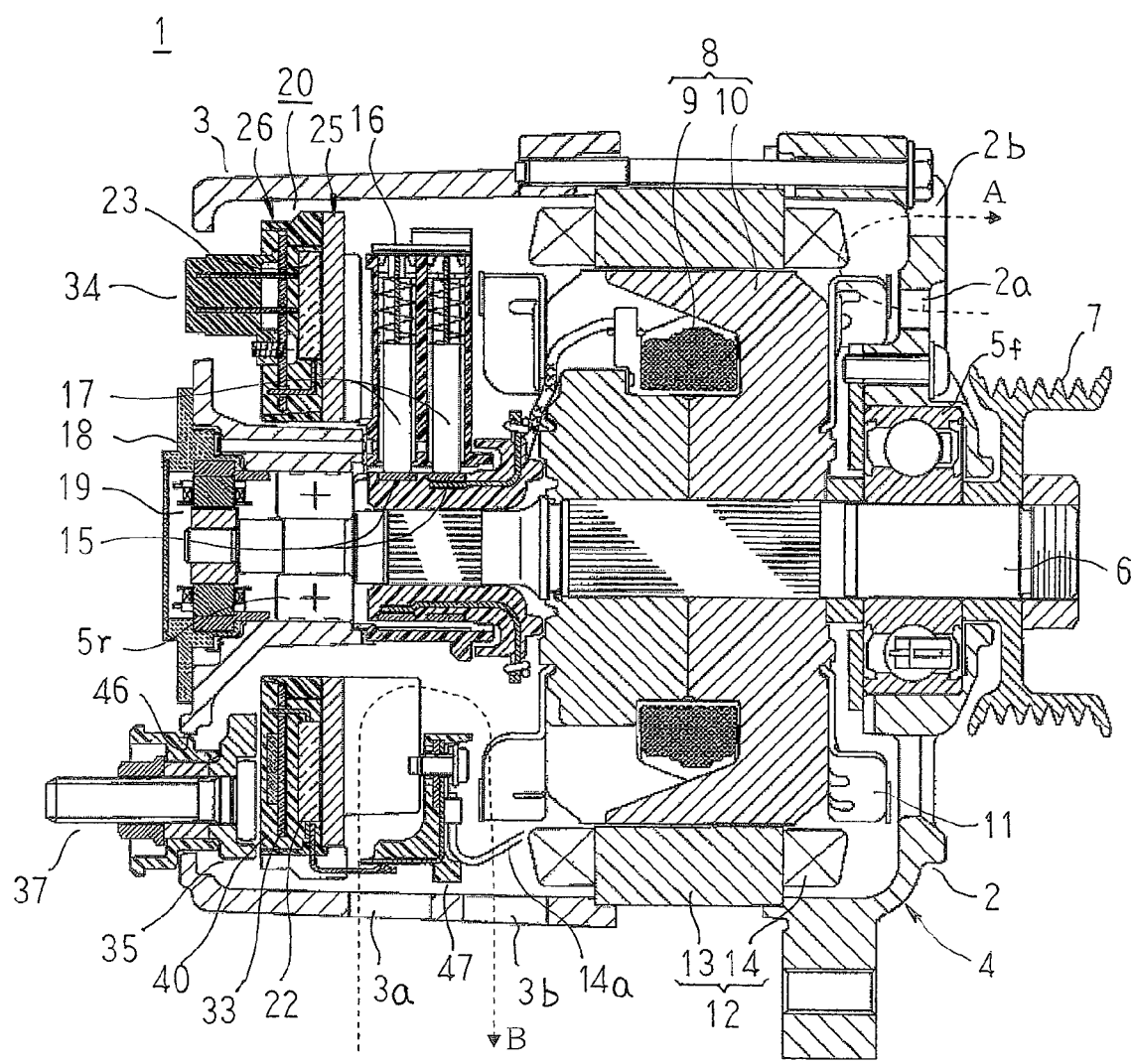
FIG. 1 is a longitudinal cross section that shows an automotive controlling apparatus-integrated dynamoelectric machine according to Embodiment 1 of the present invention.
Figure 2:
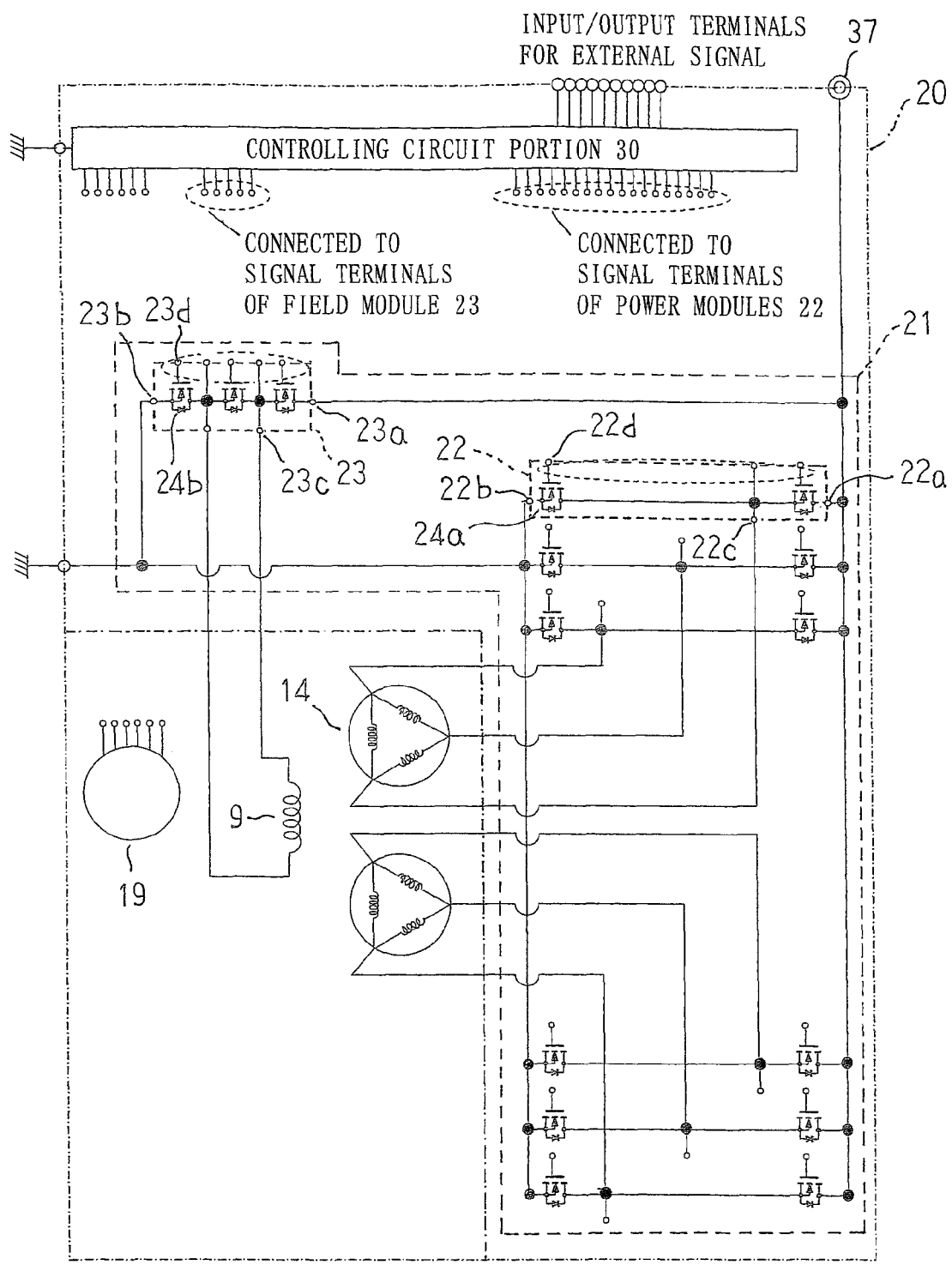
FIG. 2 is an electrical circuit diagram of the automotive controlling apparatus-integrated dynamoelectric machine according to Embodiment 1 of the present invention.
Figure 3:
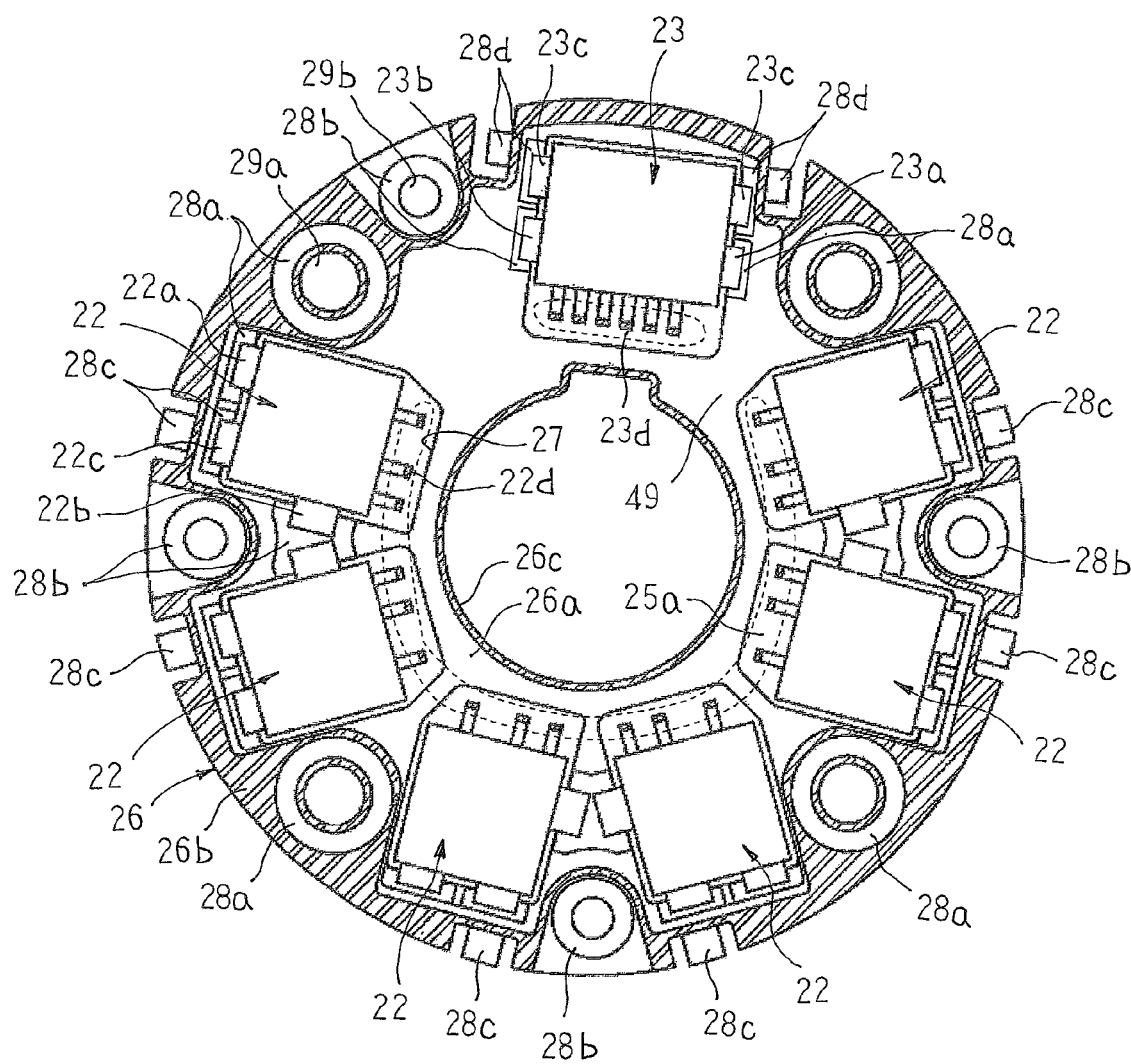
FIG. 3 is a view from a rear end of a cross section in which a state of a controlling apparatus before mounting a controlling circuit board is sectioned in a plane that is perpendicular to an axial direction in the automotive controlling apparatus-integrated dynamoelectric machine according to Embodiment 1 of the present invention.
Figure 4:
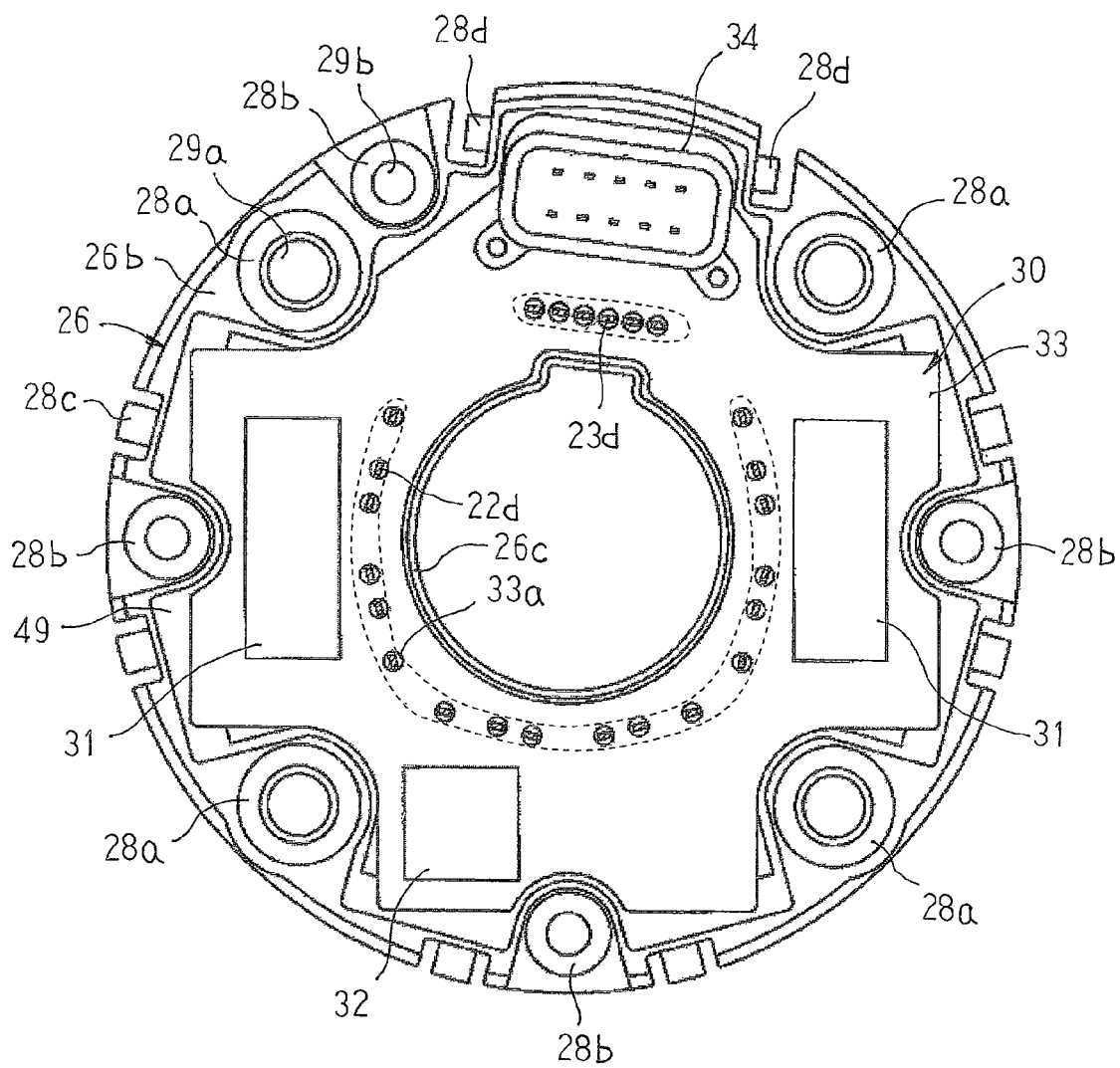
FIG. 4 is a view from a rear end of a state of the controlling apparatus before mounting a bus bar in the automotive controlling apparatus-integrated dynamoelectric machine according to Embodiment 1 of the present invention.
Figure 5:
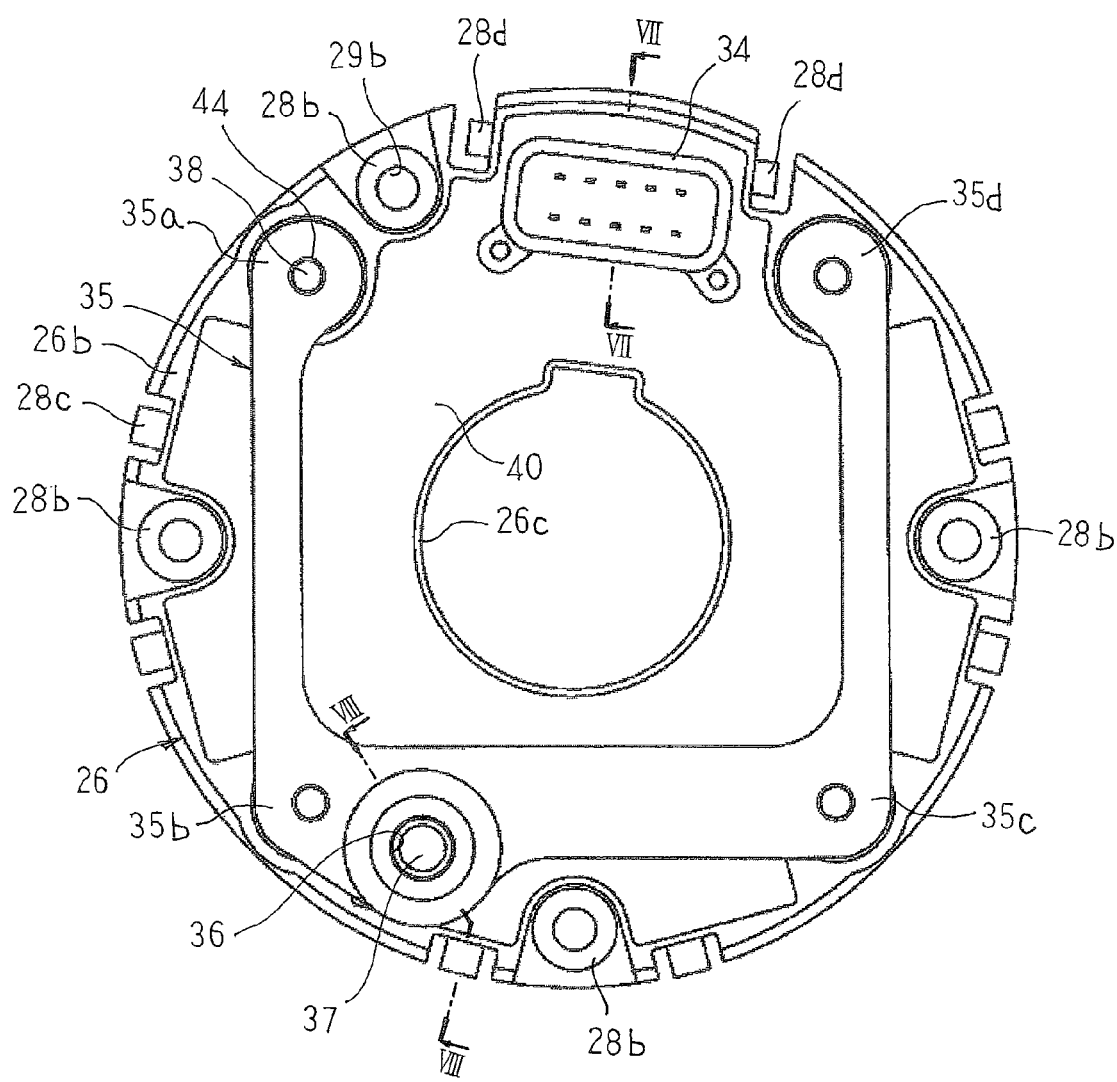
FIG. 5 is a view from a rear end of the controlling apparatus in the automotive controlling apparatus-integrated dynamoelectric machine according to Embodiment 1 of the present invention.
Figure 6:
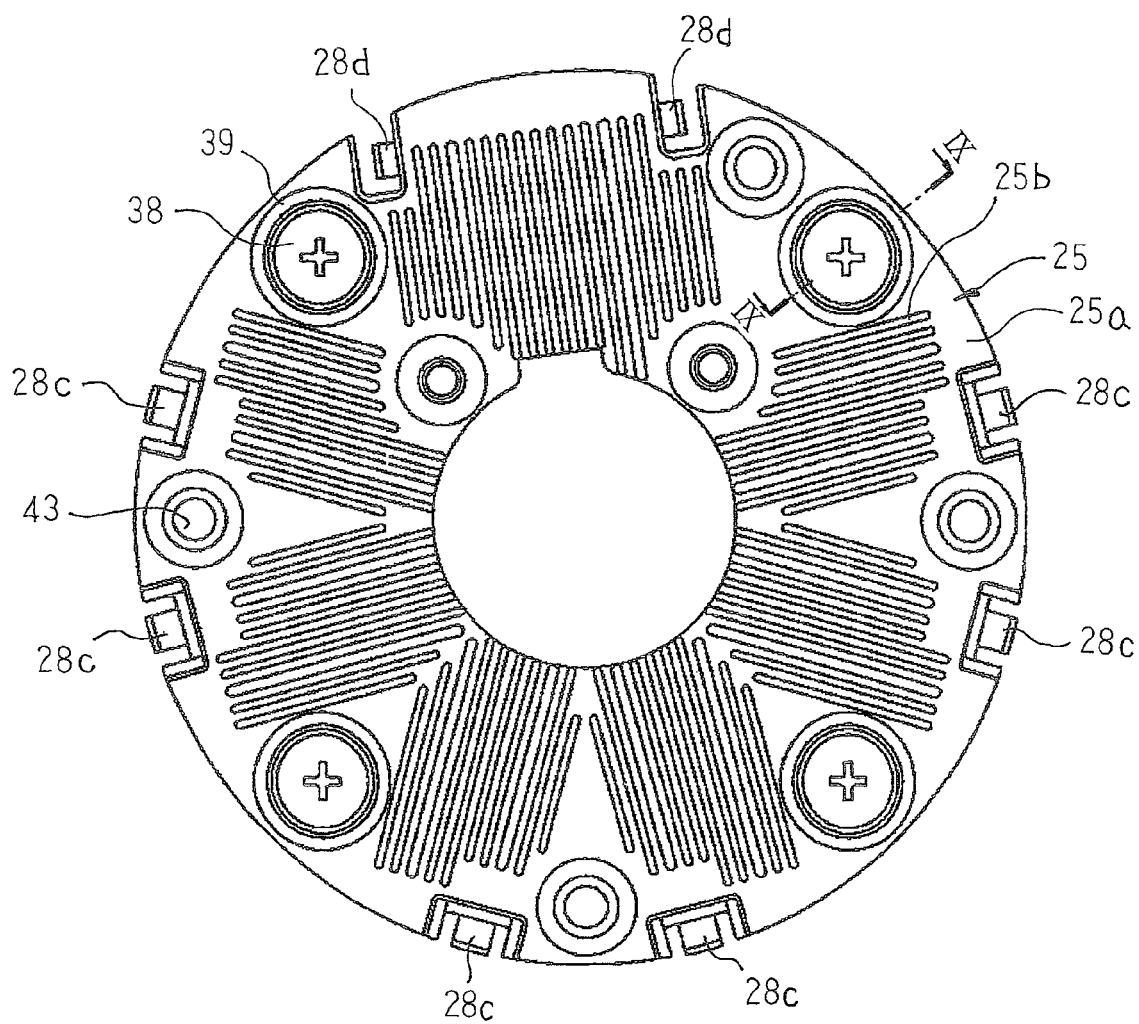
FIG. 6 is a view from a front end of the controlling apparatus in the automotive controlling apparatus-integrated dynamoelectric machine according to Embodiment 1 of the present invention.
Figure 7:
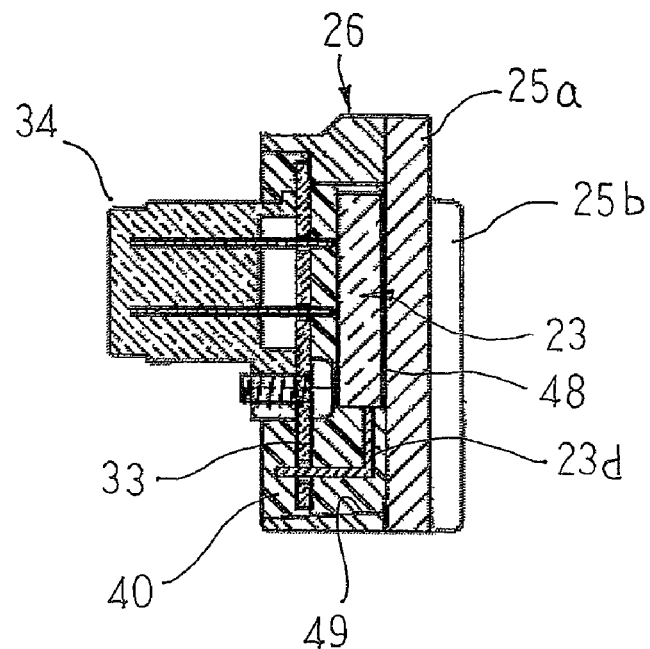
FIG. 7 is a cross section that is taken along Line VII-VII in FIG. 5 so as to be viewed in the direction of the arrows.
Figure 8:
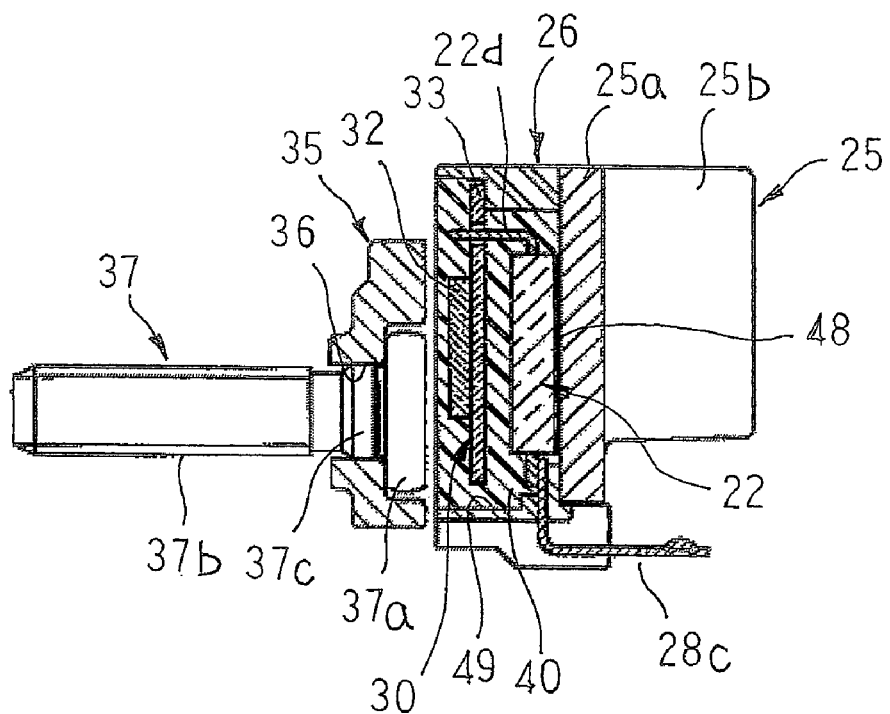
FIG. 8 is a cross section that is taken along Line VIII-VIII in FIG. 5 so as to be viewed in the direction of the arrows.
Figure 9:
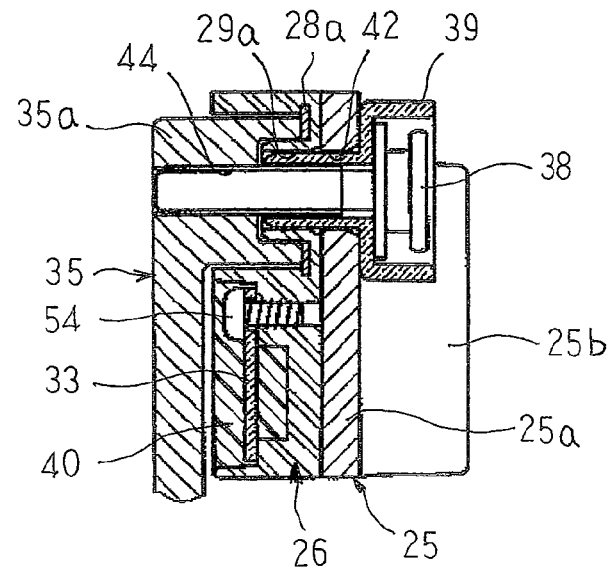
FIG. 9 is a cross section that is taken along Line IX-IX in FIG. 6 so as to be viewed in the direction of the arrows.
Figure 10:
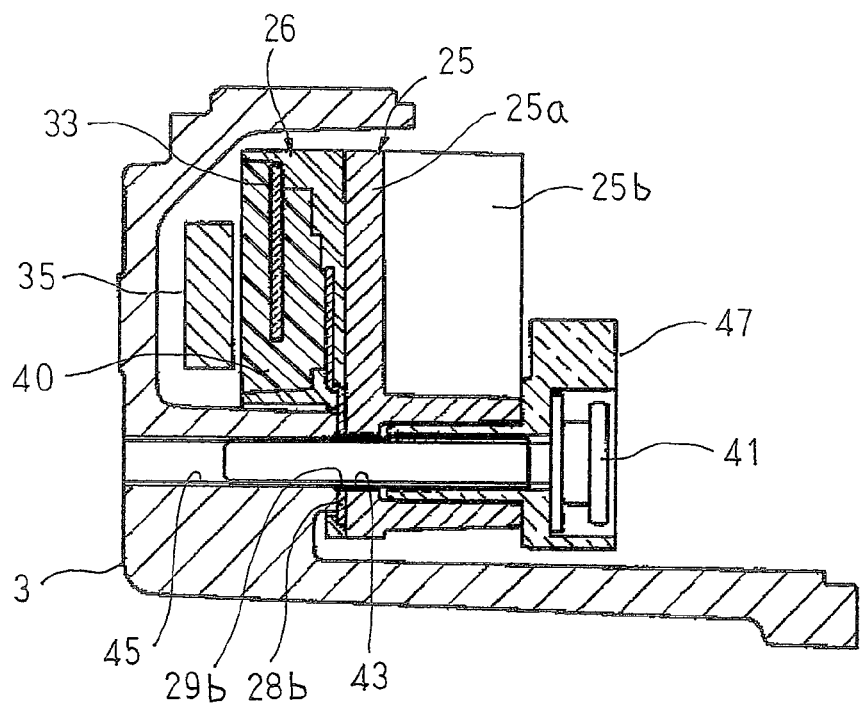
FIG. 10 is a cross section that explains a construction for mounting the controlling apparatus in the automotive controlling apparatus-integrated dynamoelectric machine according to Embodiment 1 of the present invention.

FIG. 1 is a longitudinal cross section that shows an automotive controlling apparatus-integrated dynamoelectric machine according to Embodiment 1 of the present invention, FIG. 2 is an electrical circuit diagram of the automotive controlling apparatus-integrated dynamoelectric machine according to Embodiment 1 of the present invention, FIG. 3 is a view from a rear end of a cross section in which a state of a controlling apparatus before mounting a controlling circuit board is sectioned in a plane that is perpendicular to an axial direction in the automotive controlling apparatus-integrated dynamoelectric machine according to Embodiment 1 of the present invention, FIG. 4 is a view from a rear end of a state of the controlling apparatus before mounting a bus bar in the automotive controlling apparatus-integrated dynamoelectric machine according to Embodiment 1 of the present invention, FIG. 5 is a view from a rear end of the controlling apparatus in the automotive controlling apparatus-integrated dynamoelectric machine according to Embodiment 1 of the present invention, FIG. 6 is a view from a front end of the controlling apparatus in the automotive controlling apparatus-integrated dynamoelectric machine according to Embodiment 1 of the present invention, FIG. 7 is a cross section that is taken along Line VII-VII in FIG. 5 so as to be viewed in the direction of the arrows, FIG. 8 is a cross section that is taken along Line VIII-VIII in FIG. 5 so as to be viewed in the direction of the arrows, FIG. 9 is a cross section that is taken along Line IX-IX in FIG. 6 so as to be viewed in the direction of the arrows, and FIG. 10 is a cross section that explains a construction for mounting the controlling apparatus in the automotive controlling apparatus-integrated dynamoelectric machine according to Embodiment 1 of the present invention.

In FIGS. 1 through 10, an automotive controlling apparatus-integrated dynamoelectric machine 1 includes: a housing 4 that is constituted by a front bracket 2 and a rear bracket 3 that are each approximately bowl-shaped and made of a metal; a shaft 6 that is rotatably supported in the housing 4 by means of bearings 5*f* and 5*r*; a pulley 7 that is fixed to an end portion of the shaft 6 that extends outward at a front end of the housing 4; a rotor 8 that is fixed to the shaft 6 and that is disposed inside the housing 4; fans 11 that are fixed to two axial end surfaces of the rotor 8; a stator 12 that is fixed to the housing 4 so as to surround the rotor 8; a pair of slip rings 15 that are fixed to a rear end of the shaft 6, and that supply electric current to the rotor 8; a pair of brushes 17 that are housed inside a brush holder 16 that is disposed outside the pair of slip rings 15 so as to slide on the respective slip rings 15; a rotational position detecting sensor 19 that is disposed on a rear-end end portion of the shaft 6 so as to be held in a resin case 18 that is mounted to an outer axial end surface of the rear bracket 3; and a controlling apparatus 20 that is disposed inside the rear bracket 3 so as to surround a bearing 5*r*. Here, the front bracket 2 and the rear bracket 3 are prepared using a metal material such as aluminum, etc.

The rotor 8 includes: a field winding 9 that generates magnetic flux on passage of an excitation current; and a pole core 10 that is disposed so as to cover the field winding 9, and in which magnetic poles are formed by the magnetic flux. The stator 12 includes: a stator core 13 that is disposed so as to be held between the front bracket 2 and the rear bracket 3 from two axial ends so as to surround the rotor 8; and a stator winding 14 that is mounted to the stator core 13.

The controlling apparatus 20 includes: a direct-current alternating-current power interconverting circuit portion 21 that supplies alternating-current power to the stator winding 14, and that passes direct current to the field winding 9; a controlling circuit portion 30 that controls the direct-current alternating-current power interconverting circuit portion 21; a bus bar 35 that inputs and outputs electric power to and from the direct-current alternating-current power interconverting circuit portion 21 through battery terminals; and an input-output terminal bolt 37. The controlling apparatus 20 is disposed at a rear end of the rotor 8 inside the rear bracket 3 so as to be fixed to and held by the rear bracket 3.

The direct-current alternating-current power interconverting circuit portion 21 includes: power modules 22 that supply alternating-current power to the stator winding 14; a field module 23 that passes direct current to the field winding 9; a heatsink 25 onto which the power modules 22 and the field module 23 are mounted; and a resin case 26.

The power modules 22 are prepared by molding pairs of elements in which first and second stator electric current switching elements 24*a* that pass a stator electric current are connected in series, and have a battery terminal 22*a*, a ground terminal 22*b*, an alternating-current output terminal 22*c*, and a signal terminal 22*d*. The signal terminals 22*d* are terminals that are connected to connecting points between a source of the first stator electric current switching element 24*a* and a drain of the second stator electric current switching element 24*a* that are connected in series, and terminals that are connected to gate electrodes of each of the stator electric current switching elements 24*a*.

The field module 23 is prepared by molding an element group in which three field current switching elements 24*b* that pass a field current are connected in series, and has a battery terminal 23*a*, a ground terminal 23*b*, output terminals 23*c*, and signal terminals 23*d*. Moreover, semiconductor switching elements such as metal-oxide-semiconductor field-effect transistors (MOSFETs), insulated gate bipolar transistors (IGBTs), etc., are used in the stator electric current switching elements 24*a* and the field current switching elements 24*b*, for example.

The heatsink 25 is prepared using a metal material that has good thermal conductivity such as aluminum, copper, etc., and has: a base portion 25*a* that is formed into a ring-shaped flat plate; and radiating fins 25*b* that are disposed so as to stand on a back surface of the base portion 25*a*. The power modules 22 and the field module 23 are mounted onto a front surface of the base portion 25*a* so as to be arranged so as to have a predetermined clearance circumferentially and so as to have an electrically insulating layer 48 that has good thermal conductivity interposed. A plurality of the radiating fins 25*b* are disposed so as to stand on respective back surface regions of the base portion 25*a* corresponding to mounting regions of the power modules 22 and the field module 23 so as to extend approximately radially so as to be separated from each other in a circumferential direction. Four bus bar mounting apertures 42 are disposed through outer circumferential edge portions of the heatsink 25 so as to have a predetermined spacing circumferentially. In addition, four heatsink mounting apertures 43 are also disposed through outer circumferential edge portions of the heatsink 25 so as to have a predetermined spacing circumferentially.

The resin case 26 is a resin-molded body that has been molded using an electrically insulating resin such as a polyethylene terephthalate resin, etc., and has: a bottom portion 26*a* that is formed into a ring-shaped flat plate that has an external shape and an internal shape that are similar to those of the heatsink 25; a ring-shaped outer peripheral partitioning wall 26*b* that is disposed so as to project around an entire circumference of an outer peripheral portion of the bottom portion 26*a*; a ring-shaped inner peripheral partitioning wall 26*c* that is disposed so as to project around an entire circumference of an inner circumferential edge portion of the bottom portion 26*a*; and opening portions 27 that are formed on the bottom portion 26*a* so as to correspond to mounting positions of the power modules 22 and the field module 23. Inserted conductors that constitute four battery electric potential connecting terminals 28*a*, four ground electric potential connecting terminals 28*b*, six stator winding connecting terminals 28*c*, and two field winding connecting terminals 28*d* are insert-molded integrally into the resin case 26.

As shown in FIG. 3, the respective battery electric potential connecting terminals 28*a* are insert-molded so as to be exposed on outer peripheral portions of the bottom portion 26a and edge portions of the opening portions 27. Four portions of the battery electric potential connecting terminals 28a that are exposed near the outer peripheral portion are formed so as to have ring shapes and so as to have a predetermined spacing circumferentially. Insertion apertures 29a are formed on the bottom portion 26a so as to pass through openings in these ring shapes.

As shown in FIG. 3, the respective ground electric potential connecting terminals 28b are insert-molded so as to be exposed on outer peripheral portions of the bottom portion 26a and edge portions of the opening portions 27. Four portions of the ground electric potential connecting terminals 28b that are exposed near the outer peripheral portion are formed so as to have ring shapes and so as to have a predetermined spacing circumferentially. Insertion apertures 29b are formed on the outer peripheral partitioning wall 26b so as to pass through openings in these ring shapes.

As shown in FIG. 3, the respective stator winding connecting terminals 28c and field winding connecting terminals 28d are insert-molded so as to be exposed on outer peripheral portions of the bottom portion 26a and edge portions of the opening portions 27.

The outer peripheral partitioning wall 26b is disposed so as to extend annularly around the entire circumference of the outer peripheral portion of the bottom portion 26a so as to avoid the portions of the battery electric potential connecting terminals 28a, the ground electric potential connecting terminals 28b, the stator winding connecting terminals 28c, and the field winding connecting terminals 28d that are exposed near the outer peripheral portion.

Here, the insertion apertures 29a and 29b of the battery electric potential connecting terminals 28 and the ground electric potential connecting terminals 28b are respectively aligned with aperture positions of the bus bar mounting apertures 42 and the heatsink mounting apertures 43 when the resin case 26 is stacked on the heatsink 25.

The resin case 26 is disposed so as to be stacked on the front surface of the base portion 25a such that a rear surface thereof is oriented toward the front surface of the base portion 25a of the heatsink 25. Here, a space that is surrounded by the bottom portion 26a, the base portion 25a, the outer peripheral partitioning wall 26b, and the inner peripheral partitioning wall 26c constitutes a housing space 49.

The power modules 22 are mounted onto respective module mounting regions of the heatsink 25 by fixing rear surfaces thereof to the front surface of the base portion 25a that is exposed inside the opening portions 27 so as to have an electrically insulating layer 48 interposed. The battery terminals 22a and the battery electric potential connecting terminals 28a, the ground terminals 22b and the ground electric potential connecting terminals 28b, and the alternating-current output terminals 22c and the stator winding connecting terminals 28c are connected by soldering, etc.

Similarly, the field module 23 is mounted onto a mounting region of the heatsink 25 by fixing a rear surface thereof to the front surface of the base portion 25a that is exposed inside the opening portion 27 so as to have an electrically insulating layer 48 interposed. The battery terminal 23a and the battery electric potential connecting terminal 28a, the ground terminal 23b and the ground electric potential connecting terminal 28b, and the output terminals 23c and the field winding connecting terminals 28d are connected by soldering, etc.

The power modules 22, the field module 23, the heatsink 25, and the resin case 26 are thereby assembled into a single body, as shown in FIG. 3.

The controlling circuit portion 30 is configured by mounting electronic components such as application specific integrated circuits (ASICs) 31, and a microcomputer 32, etc., for controlling the direct-current alternating-current power interconverting circuit portion 21 to a controlling circuit board 33. Penetrating apertures 33a through which the signal terminals 22d and 23d are inserted are formed on the controlling circuit board 33. A connector 34 that performs input and output of signals externally is mounted onto the controlling circuit board 33. Moreover, the controlling circuit board 33 is formed so as to have a shape that fits inside the housing space 49, as shown in FIG. 4.

As shown in FIG. 4, the controlling circuit board 33 is placed so as to cover the power modules 22 and the field module 23, is fixed to the resin case 26 by a screw 54, and is disposed inside the housing space 49. The signal terminals 22d and 23d of the power modules 22 and the field module 23 are inserted through the penetrating apertures 33a, and are joined to a wiring pattern on the controlling circuit board 33 by soldering. The housing space 49 is filled with a sealing resin 40. The power modules 22, the field module 23, and the controlling circuit portion 30 are thereby embedded inside the sealing resin 40. Moreover, an epoxy resin, a silicone resin, a urethane resin, etc., can be used for the sealing resin 40.

As shown in FIG. 5, the bus bar 35 is prepared using a copper material, etc., so as to have an angular C shape in which two end portions and two corner portions correspond to the disposed positions of the battery electric potential connecting terminals 28a of the resin case 26. The two end portions and the two corner portions of the angular C shape are also formed so as to have wall thickenings that project outward on a rear surface side to constitute respective holding portions 35a through 35d. Internal thread portions 44 are formed so as to pass through in a thickness direction at each of the holding portions 35a through 35d. A mounting aperture 36 is also disposed through a spanning side between the holding portions 35b and 35c of the bus bar 35.

The input-output terminal bolt 37 is made of an electrically-conductive material such as iron, etc., and includes: a head portion 37a; a shaft portion 37b that is disposed so as to extend from the head portion 37a in one direction; and a knurled portion 37c that is formed on a root portion of the shaft portion 37b. As shown in FIG. 8, the input-output terminal bolt 37 is mounted to the bus bar 35 by press-fitting the knurled portion 37c into the mounting aperture 36.

The bus bar 35 is disposed so as to face the heatsink 25 from an opposite side of the controlling circuit board 33. As shown in FIG. 9, mounting bolts 38 are passed from a side near the heatsink 25 through the bus bar mounting apertures 42 and the insertion apertures 29a and are fastened into the internal thread portions 44 of the holding portions 35a through 35d, integrally fixing the heatsink 25, the resin case 26, and the bus bar 35. Here, insulating bushes 39 are interposed between the heatsink 25 and the mounting bolts 38, ensuring electrical insulation between the heatsink 25 and the bus bar 35. The holding portions 35a through 35d are placed in contact with the battery electric potential connecting terminals 28a by the fastening force of the mounting bolts 38, electrically connecting the battery electric potential connecting terminals 28a to the bus bar 35.

As shown in FIG. 10, a controlling apparatus 20 that is configured in this manner is mounted by orienting the heatsink 25 toward the rotor 8, i.e., toward the front end, and passing bolts 41 through the heatsink mounting apertures 43 and the insertion apertures 29b that are formed in the ring-shaped openings of the ground electric potential connecting terminals 28b from the front end and fastening them into internal thread portions 45 that are formed on the rear bracket 3. Here, inner wall surfaces of the rear bracket 3 and the heatsink 25 and the ground electric potential connecting terminals 28b are electrically connected due to the fastening forces from the bolts 41. The controlling apparatus 20 is disposed inside the rear bracket 3 such that the shaft 6 is inserted through aperture centers of the central apertures of the heatsink 25 and the resin case 26, and a front surface of the base portion 25a of the heatsink 25 is coplanar with a flat plane that is perpendicular to a central axis of the shaft 6.

The shaft portion 37b of the input-output terminal bolt 37 that projects axially outward from the bus bar 35 extends outward through a terminal lead-out aperture 46 that has been opened through the rear bracket 3. The output wires 14a of the stator winding 14 are electrically connected to the stator winding connecting terminals 28c by means of a connecting board 47.

Next, operation of an automotive controlling apparatus-integrated dynamoelectric machine 1 that is configured in this manner will be explained.

The automotive controlling apparatus-integrated dynamoelectric machine 1 is linked to a crank shaft (not shown) of an engine by means of the pulley 7 and a belt (not shown). A positive electrode of a battery (not shown) is connected to the input-output terminal bolt 37. The housing 4 is grounded so as to be kept at ground electric potential. The controlling circuit portion 30 controls the switching operation of the direct-current alternating-current power interconverting circuit portion 21 to control the field module 23 to adjust the field current that is passed to the field winding 9 of the rotor 8. The automotive controlling apparatus-integrated dynamoelectric machine 1 has: an electric motor function for starting the engine; and a power generating function for generating power.

Here, during starting of the engine, direct-current power is supplied from the battery to the direct-current alternating-current power interconverting circuit portion 21. The controlling circuit portion 30 performs on-off control of the stator electric current switching elements 24a of the power modules 22 of the direct-current alternating-current power interconverting circuit portion 21 to convert the direct-current power to three-phase alternating-current power. The three-phase alternating-current power is supplied to the stator winding 14. Thus, a rotating magnetic field is applied to the field winding 9 of the rotor 8 to which a field current is being supplied by the field module 23, driving the rotor 8 to rotate. Rotational torque from the rotor 8 is transmitted to the engine by means of the shaft 6, the pulley 7, and the belt (not shown) so as to ignite and start the engine.

Then, once the engine has been started, rotational torque from the engine is transmitted to the automotive controlling apparatus-integrated dynamoelectric machine 1 by means of a crank pulley, the belt, and the pulley 7. Thus, the rotor 8 is rotated, inducing a three-phase alternating-current voltage in the stator winding 14. Then, the controlling circuit portion 30 performs on-off control of the stator electric current switching elements 24a of the power modules 22 of the direct-current alternating-current power interconverting circuit portion 21 such that the three-phase alternating-current power that has been induced in the stator winding 14 is converted into direct-current power, and is supplied to the battery, and electric loads, etc.

Moreover, signal output from the rotational position detecting sensor 19 is sent to the controlling circuit portion 30 and is used for rotational position detection of the rotor 8, and is utilized used as control information during the power generating operation and the engine starting operation of the automotive controlling apparatus-integrated dynamoelectric machine 1.

The fans 11 are also driven to rotate due to the rotation of the rotor 8, sucking cooling airflows inside the front bracket 2 and the rear bracket 3 through air intake apertures 2a and 3a that are formed on the front bracket 2 and the rear bracket 3.

At the front end, as indicated by arrow A in FIG. 1, a cooling airflow that has been sucked inside the front bracket 2 is deflected centrifugally by the fans 11, and is discharged through air discharge apertures 2b that are formed on the front bracket 2. At the same time, at the rear end, as indicated by arrow B in FIG. 1, a cooling airflow that has been sucked into the rear bracket 3 flows radially inward between the radiating fins 25b, flows out radially inside the heatsink 25, then flows axially to the rotor 8, is then deflected centrifugally by the cooling fans 11, and is discharged through air discharge apertures 3b that are formed on the rear bracket 3.

Heat that is generated in the stator winding 14 is radiated to the cooling airflows that are deflected centrifugally by the cooling fans 11 and discharged through the air discharge apertures 2b and 3b. The heat that is generated by the power modules 22 and the field module 23 is transferred to the heatsink 25, and is radiated to the cooling airflow that flows through between the radiating fins 25b.

According to Embodiment 1, because the controlling apparatus 20 is disposed inside the rear bracket 3, external mechanical shocks do not act directly on the controlling apparatus 20, and external airborne objects will not collide into the controlling apparatus 20. Thus, damage to the controlling apparatus 20 that results from external mechanical shocks and collisions with airborne objects can be prevented.

The controlling circuit portion 30 is disposed on an opposite side of the power modules 22 and the field module 23 from the heatsink 25. Thus, because the heat that is generated by the power modules 22 and the field module 23 is transferred to the base portion 25a of the heatsink 25, and is radiated from the radiating fins 25b, the controlling circuit portion 30 is less likely to be affected by the heat that is generated by the power modules 22 and the field module 23, enabling temperature increases in the ASICs 31 and the microcomputer 32, etc., to be suppressed.

The controlling circuit board 33 is disposed inside the housing space 49 in which the power modules 22 and the field module 23 are housed. The signal terminals 22d and 23d of the power modules 22 and the field module 23 are inserted through the penetrating apertures 33a, and are joined to the wiring pattern on the controlling circuit board 33 by soldering. Thus, because cables that connect the input/output terminals of the ASICs 31 and the microcomputer 32 and the signal terminals 22d and 23d are no longer required, the number of parts is reduced, and cable connecting work is no longer required, enabling costs to be reduced. Because axial lengths of the signal terminals 22d and 23d can be shortened, axial dimensions of the controlling apparatus 20 can be reduced, enabling reductions in the size of the automotive controlling apparatus-integrated dynamoelectric machine 1 to be achieved. In addition, because lengths of signal wires between the power modules 22 and the field module 23 and the ASICs 31 and the microcomputer 32 are shorter, external noise is less likely to be superposed on the signal wires, improving reliability of the automotive controlling apparatus-integrated dynamoelectric machine 1.

The power modules 22, the field module 23, and the controlling circuit portion 30 that are housed inside the housing space 49 are embedded in the sealing resin 40. Thus, even if salt water, etc., does happen to enter the automotive controlling apparatus-integrated dynamoelectric machine 1, the salt water is blocked from reaching the power modules 22, the field module 23, and the controlling circuit portion 30 by the sealing resin 40, enabling short-circuiting or corrosion of the power modules 22, the field module 23, and the controlling circuit portion 30 to be prevented. If a high-strength resin such as an epoxy resin, etc., is used as the sealing resin 40, rigidity of the controlling apparatus 20 can be increased, enabling damage to the controlling apparatus 20 that results from external mechanical shocks and collisions with airborne objects to be reliably prevented. If an elastic resin such as a silicone resin or a urethane resin, etc., is used as the sealing resin 40, stresses that result from differences in thermal expansion can be absorbed by the sealing resin 40, suppressing occurrences of wire breakage, etc.

Embodiment 2

Figure 11:
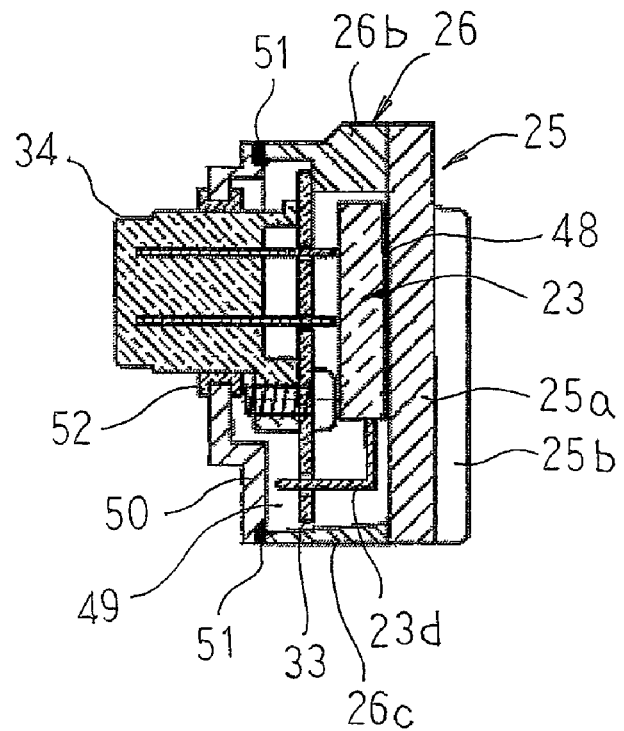
FIG. 11 is a partial cross section that shows a vicinity of a field module of a controlling apparatus in an automotive controlling apparatus-integrated dynamoelectric machine according to Embodiment 2 of the present invention.
Figure 12:
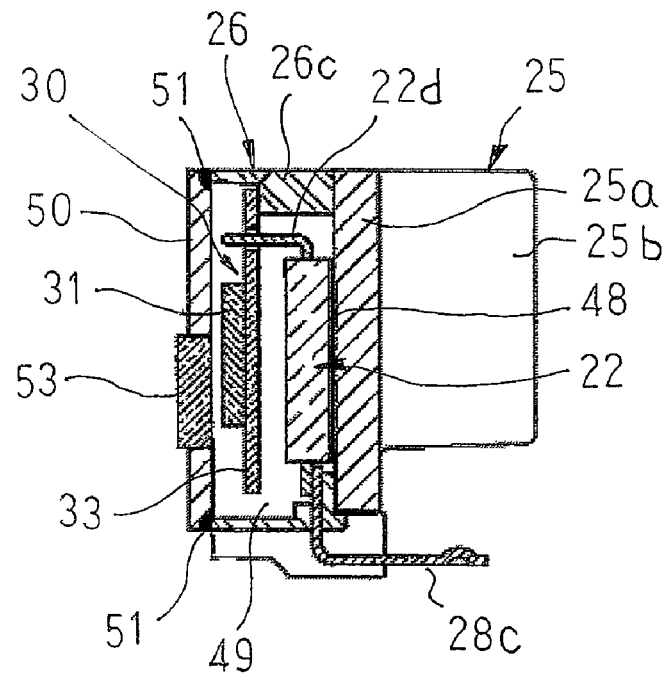
FIG. 12 is a partial cross section that shows a vicinity of a power module of the controlling apparatus in the automotive controlling apparatus-integrated dynamoelectric machine according to Embodiment 2 of the present invention.

FIG. 11 is a partial cross section that shows a vicinity of a field module of a controlling apparatus in an automotive controlling apparatus-integrated dynamoelectric machine according to Embodiment 2 of the present invention, and FIG. 12 is a partial cross section that shows a vicinity of a power module of the controlling apparatus in the automotive controlling apparatus-integrated dynamoelectric machine according to Embodiment 2 of the present invention.

In FIGS. 11 and 12, a resin cover 50 is fixed to an outer peripheral partitioning wall 26*b* and an inner peripheral partitioning wall 26*c* of a resin case 26 using an adhesive 51 and a screw (not shown), and covers a housing space 49 that houses power modules 22, a field module 23, and a controlling circuit board 33. A packing 52 is interposed between a connector 34 and the cover 50 to ensure water proofing. An air-permeable filter 53 that has dustproofing, waterproofing, and water repelling functions is mounted to the cover 50. The filter 53 is constituted by a porous membrane of a polytetrafluoroethylene (PTFE) resin, for example.

Moreover, the rest of the configuration is configured in a similar manner to Embodiment 1 above.

In Embodiment 2, because water proofing of the housing space 49 for the power modules 22, the field module 23, and the controlling circuit portion 30 is ensured, short-circuiting or corrosion of the power modules 22, the field module 23, and the controlling circuit portion 30 can also be prevented even if salt water, etc., does happen to enter the automotive controlling apparatus-integrated dynamoelectric machine 1.

Because the housing space 49 that houses the power modules 22, the field module 23, and the controlling circuit board 33 is covered by the cover 50, damage to the controlling apparatus 20 that results from external mechanical shocks and collisions with airborne objects can be reliably prevented.

In Embodiment 2, the housing space 49 is not filled with a sealing resin 40, but the housing space 49 may also be filled with a sealing resin 40. The cover 50 may also be prepared using a metal.

Moreover, in each of the above embodiments, a base portion of a heatsink is prepared into a ring-shaped flat plate, but the shape of the base portion of the heatsink is not limited to being a ring-shaped flat plate, and may also be a fan-shaped flat plate, for example. In that case, it is not absolutely necessary for a bottom portion of a resin case to be formed so as to have a similar external shape to that of the base portion of the heatsink, but it may also be prepared into a fan-shaped flat plate similar to the base portion of the heatsink. A controlling apparatus may be disposed such that a center of the fan shape of the heatsink is approximately aligned with a central axis of the shaft.

What is claimed is:

1. An automotive controlling apparatus-integrated dynamoelectric machine comprising:
    a metal housing that comprises a front bracket and a rear bracket;
    a rotor that is rotatably disposed inside said housing by being fixed to a shaft that is rotatably supported by said front bracket and said rear bracket;
    a stator comprising:
        a cylindrical stator core that is disposed so as to be held between said front bracket and said rear bracket so as to surround said rotor; and
        a stator winding that is mounted to said stator core; and
    a controlling apparatus comprising:
        a direct-current alternating-current power interconverting circuit portion that passes electric current to said stator winding; and
        a controlling circuit portion that controls said direct-current alternating-current power interconverting circuit portion,
    wherein said controlling apparatus is disposed inside said rear bracket, and
    wherein:
    said direct-current alternating-current power interconverting circuit portion comprises:
        a heat sink that is shaped into a ring-shaped flat plate or a fan-shaped flat plate, and on a rear surface of which radiating fins are disposed so as to stand;
        a resin case that is a resin-molded body into which a plurality of inserted conductors are insert-molded, that has a battery electric potential connecting terminal, a ground electric potential connecting terminal, and a stator winding connecting terminal that are constituted by exposed portions of said inserted conductors, that is disposed on a front surface side of said heatsink, and that functions together with said heatsink to configure a housing space that has an opening on an opposite side from said heatsink; and
        a plurality of power modules that are each prepared by molding stator electric current switching elements that pass direct current to said stator winding, that have a battery terminal, a ground terminal, an alternating-current output terminal, and a signal terminal, that are disposed inside said housing space so as to be mounted onto said front surface of said heatsink so as to have an electrically insulating layer interposed, and in which said battery terminal, said ground terminal, and said alternating-current output terminal are electrically connected to said battery electric potential connecting terminal, said ground electric potential connecting terminal, and said stator winding connecting terminal; and
    said controlling circuit portion is configured by mounting electronic components to a controlling circuit board, is housed inside said housing space, and is electrically connected to said signal terminals of said plurality of power modules.

2. An automotive controlling apparatus-integrated dynamoelectric machine according to claim 1, further comprising:
    a fan that is fixed to a rear-end end surface of said rotor to form a cooling airflow ventilation channel in which a cooling airflow is sucked in due to rotation of said rotor through an air intake aperture that is formed on said rear bracket, is subsequently deflected centrifugally, and is discharged through an air discharge aperture that is formed on said rear bracket,
    said controlling apparatus being disposed such that said cooling airflow that has been sucked in through said air intake aperture that is formed on said rear bracket flows through between said radiating fins of said heatsink, and said controlling circuit portion being disposed on an opposite side of said plurality of power modules from said heatsink.

3. An automotive controlling apparatus-integrated dynamoelectric machine according to claim 1, wherein said signal terminals of said plurality of power modules are connected directly to said controlling circuit board.

4. An automotive controlling apparatus-integrated dynamoelectric machine according to claim 1, wherein said housing space is filled with a sealing resin so as to embed said plurality of power modules and said controlling circuit portion.

5. An automotive controlling apparatus-integrated dynamoelectric machine according to claim 1, wherein a cover is fixed to said resin case so as to cover said housing space.

* * * * *